(12) United States Patent
Lin et al.

(10) Patent No.: US 11,210,215 B2
(45) Date of Patent: Dec. 28, 2021

(54) COMPUTING DEVICE AND OPERATION METHOD THEREOF

(71) Applicant: NEUCHIPS CORPORATION, Hsinchu (TW)

(72) Inventors: Youn-Long Lin, Hsinchu County (TW); Chao-Yang Kao, Hsinchu (TW); Huang-Chih Kuo, Hsinchu (TW)

(73) Assignee: NEUCHIPS CORPORATION, Hsinchu (TW)

( * ) Notice: Subject to any disclaimer, the term of this patent is extended or adjusted under 35 U.S.C. 154(b) by 130 days.

(21) Appl. No.: 16/794,183

(22) Filed: Feb. 18, 2020

(65) Prior Publication Data

US 2021/0096987 A1 Apr. 1, 2021

Related U.S. Application Data

(60) Provisional application No. 62/908,609, filed on Oct. 1, 2019.

(30) Foreign Application Priority Data

Jan. 8, 2020 (TW) .................................. 109100518

(51) Int. Cl.
*G06F 12/02* (2006.01)

(52) U.S. Cl.
CPC .. *G06F 12/0292* (2013.01); *G06F 2212/1024* (2013.01)

(58) Field of Classification Search
CPC .. G06F 12/0292; G06F 12/10; G06F 12/1009; G06F 12/1072; G06F 2212/651; G06F 2212/681
See application file for complete search history.

(56) References Cited

U.S. PATENT DOCUMENTS

| 7,184,944 B1* | 2/2007 | Rieschl ................... G06F 12/10 |
| | | 703/21 |
| 9,058,284 B1* | 6/2015 | Ben-Meir ............... G06F 12/10 |
| 9,880,939 B2* | 1/2018 | Watanabe ........... G06F 12/0871 |
| 10,175,885 B2 | 1/2019 | Kanno et al. |

(Continued)

FOREIGN PATENT DOCUMENTS

| CN | 103927127 | 7/2014 |
| TW | 201337735 | 9/2013 |

OTHER PUBLICATIONS

W. Zhang, G. A. Jullien and V. S. Dimitrov, "A programmable base MDLNS MAC with self-generated lookup table," 4th IEEE International Workshop on System-on-Chip for Real-Time Applications, 2004, pp. 61-64, doi: 10.1109/IWSOC.2004.1319850. (Year : 2004).*

(Continued)

*Primary Examiner* — Khoa D Doan
(74) *Attorney, Agent, or Firm* — JCIPRNET

(57) ABSTRACT

A computing device and an operation method thereof are provided. The computing device includes a plurality of memories and a processing circuit. The processing circuit is coupled to the memories. The processing circuit dynamically determines which of the plurality of memories to store at least one lookup table according to characteristics of the at least one lookup table. The processing circuit may then execute at least one algorithm by using the at least one lookup table.

17 Claims, 6 Drawing Sheets

(56) References Cited

U.S. PATENT DOCUMENTS

2017/0090754 A1* 3/2017 Horn ................. G06F 3/061
2018/0081569 A1* 3/2018 Kan ................. G06F 12/121

OTHER PUBLICATIONS

K. Bang, S. Park, M. Jun and E. Chung, "A memory hierarchy-aware metadata management technique for Solid State Disks," 2011 IEEE 54th International Midwest Symposium on Circuits and Systems (MWSCAS), 2011, pp. 1-4. (Year: 2011).*

* cited by examiner

COMPUTING DEVICE AND OPERATION METHOD THEREOF

CROSS-REFERENCE TO RELATED APPLICATION

This application claims the priority benefits of U.S. provisional application Ser. No. 62/908,609, filed on Oct. 1, 2019, and Taiwan application serial no. 109100518, filed on Jan. 8, 2020. The entirety of each of the above-mentioned patent applications is hereby incorporated by reference herein and made a part of this specification.

BACKGROUND OF THE INVENTION

1. Field of the Invention

The invention relates to an electronic device, and in particular, to a computing device and an operation method thereof.

2. Description of Related Art

In many applications, a computing device needs to use one or more lookup tables. For example, a recommendation system is a message analysis system, and is configured to predict a "grade" or a "preference" of a user on an object or a service. A common recommendation system is composed of a word embedding table lookup module and a neural network computation module. A word embedding table is mostly composed of a plurality of several to dozens of lookup tables of different volumes. A larger lookup table may occupy a capacity of several gigabytes, and a smaller lookup table may need to occupy a capacity of only several bytes. A result of the recommendation system can be obtained by computing, through a neural network, a message obtained through table lookup.

A general computing device includes a hard disk drive (HDD) and a random access memory (RAM). The hard disk drive has a large storage space (low cost) but a low access speed. The random access memory has a high access speed but a small storage space (high cost). Before a system is powered off, a processor moves a lookup table from the random access memory to the hard disk drive. After the system is powered on, the processor moves the lookup table from the hard disk drive to the random access memory, so as to improve the access speed and system performance. In any case, owing to a limited capacity of the random access memory, some lookup tables (for example, a lookup table A) may be not moved to the random access memory temporarily. In a case that the space of a memory has been fully occupied, when the lookup table A in the hard disk drive needs to be accessed, the processor may write a lookup table B in the random access memory back to the hard disk drive, and then move the lookup table A from the hard disk drive to the random access memory. Therefore, a large quantity of data usually needs to be moved between different storage media in a process of table lookup, thereby causing an overlong time required for table lookup.

In addition, a current lookup table is stored in a specific memory, no matter whether there is another more suitable memory to store the lookup table in a system. A general computing device includes a plurality of types of memories. For example, the computing device may have a faster memory and a slower memory. A current table lookup system may not have different processing manners according to characteristics of the lookup table, that is, may not dynamically determine which of the plurality of memories to store the lookup table, and consequently the table lookup is inefficient. For example, the lookup table which is accessed frequently may be stored in the slower memory by default, thereby causing an overlong time required for table lookup.

The information disclosed in this "Related Art" is only for enhancement of understanding of the invention. Part of the information (or all information) disclosed in this "Related Art" does not form the prior art that is already known to a person of ordinary skill in the art. Further, the information disclosed in the "Related Art" does not mean that the information has been acknowledged by a person of ordinary skill in the art.

SUMMARY OF THE INVENTION

The invention provides a computing device and an operation method thereof, to access a lookup table in a memory.

The computing device in the invention includes a plurality of memories and a processing circuit. The processing circuit is coupled to the plurality of memories. The processing circuit dynamically determines which of the plurality of memories to store at least one lookup table according to characteristics of the at least one lookup table. The processing circuit may then execute at least one algorithm by using the at least one lookup table.

The operation method in the invention includes: dynamically determining, by a processing circuit, which of a plurality of memories to store at least one lookup table according to characteristics of the at least one lookup table; and executing, by the processing circuit, at least one algorithm by using the at least one lookup table.

The computing device in the invention includes at least one memory, a processor, and at least one table lookup circuit. The at least one memory is configured to store at least one lookup table. The processor is configured to give a table lookup command and execute at least one algorithm. The at least one table lookup circuit is coupled to the processor and the at least one memory. When the processor gives a table lookup command to the at least one table lookup circuit, the at least one table lookup circuit looks up, according to the table lookup command from the processor, the at least one lookup table stored in the at least one memory to obtain at least one piece of corresponding data. The processor executes the at least one algorithm by using the at least one piece of corresponding data provided by the at least one table lookup circuit.

Based on the foregoing, in some embodiments, the processing circuit may dynamically determine which of the plurality of memories to store a lookup table according to characteristics of the lookup table. Therefore, the table lookup efficiency may be effectively improved. In some embodiments, the table lookup circuit may look up, according to the table lookup command given by the processor, the lookup table stored in the memory, and then transfer a table lookup result (the corresponding data) back to the processor. Therefore, the table lookup circuit may share the workload, thereby effectively improving the efficiency of the processor.

In order to make the aforementioned and other objectives and advantages of the invention comprehensible, embodiments accompanied with figures are described in detail below.

DESCRIPTION OF THE EMBODIMENTS

Figure 1:
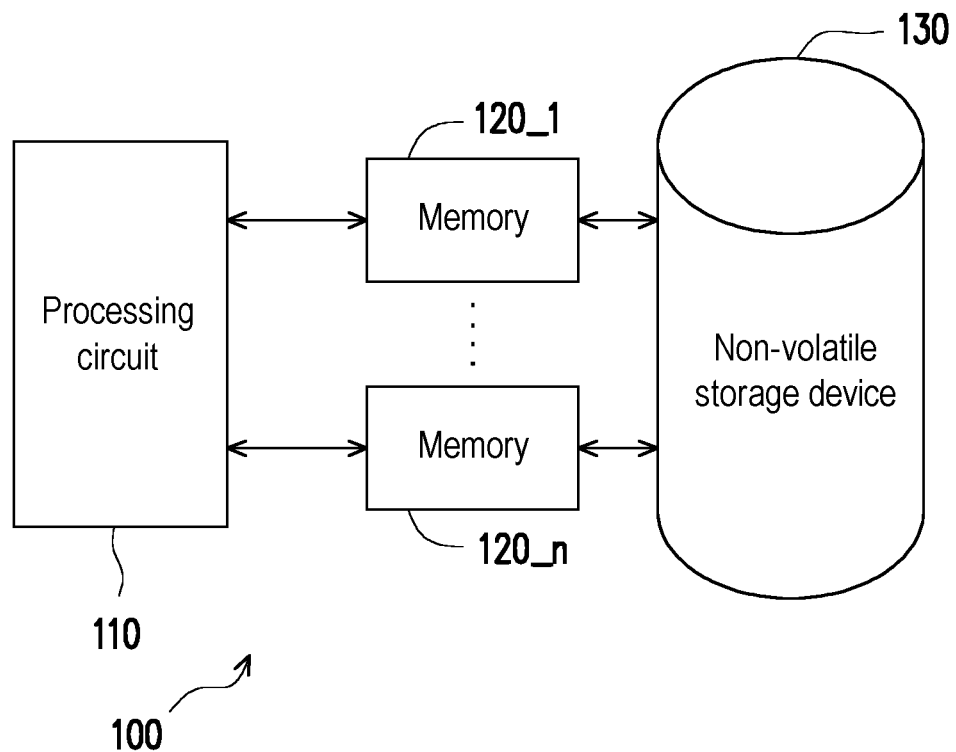
FIG. 1 is a schematic circuit block diagram of a computing device according to an embodiment of the invention.

The term "coupled to (or connected to)" used throughout this specification (including the claims) of this disclosure may refer to any direct or indirect connection means. For example, if a first apparatus is coupled to (or connected to) a second apparatus in the description of this specification, it should be interpreted as follows: the first apparatus may be directly connected to the second apparatus, or the first apparatus may be indirectly connected to the second apparatus by using another apparatus or in some connection means. The terms such as "first" or "second" mentioned throughout this specification (including the claims) of this disclosure are used to name elements, or to distinguish between different embodiments or scopes, and are neither intended to specify an upper limit or a lower limit of a quantity of the elements, nor to limit an order of the elements. In addition, wherever possible, elements/components/steps with same reference numbers in the drawings and implementations represent same or similar parts. Elements/components/steps with same reference numbers or described by using same terms in different embodiments may refer to each other for related descriptions.

FIG. 1 is a schematic circuit block diagram of a computing device 100 according to an embodiment of the invention. In the present embodiment shown in FIG. 1, the computing device 100 includes a processing circuit 110 and a plurality of memories (for example, memories 120_1, . . . , 120_$n$). The processing circuit 110 is coupled to the memories 120_1 to 120_$n$. A quantity n of the memories 120_1 to 120_$n$ is determined according to design requirements. The memories 120_1 to 120_$n$ include a plurality of types of memories. For example, in some embodiments, the memories 120_1 to 120_$n$ may include at least two types of a static random access memory (SRAM), a dynamic random access memory (DRAM), a magnetic random-access memory (MRAM), a magnetoresistive random access memory (MRAM), and a flash memory. Generally, a memory with a lower access speed has a larger storage space (because the cost is lower), and a memory with a higher access speed has a smaller storage space (because the cost is higher).

Before the computing device 100 is powered off, the processing circuit 110 may move (write back) important data (for example, a lookup table) in the memories 120_1 to 120_$n$ to a non-volatile storage device 130 of the computing device 100. According to the design requirements, the non-volatile storage device 130 may include a hard disk drive (HDD), a solid state drive (SSD), or other non-volatile storage devices. After the computing device 100 is powered on, the processing circuit 110 may move the important data (for example, the lookup table) from the non-volatile storage device 130 to the memories 120_1 to 120_$n$. It is to be noted that, FIG. 1 depicts a data flow between the non-volatile storage device 130 and the memories 120_1 to 120_$n$. However, the data flow does not represent an actual coupling relationship between the non-volatile storage device 130 and the memories 120_1 to 120_$n$. For example, in some embodiments, the non-volatile storage device 130 may be coupled to the processing circuit 110, and the processing circuit 110 transfers data between the non-volatile storage device 130 and the memories 120_1 to 120_$n$.

Figure 2:
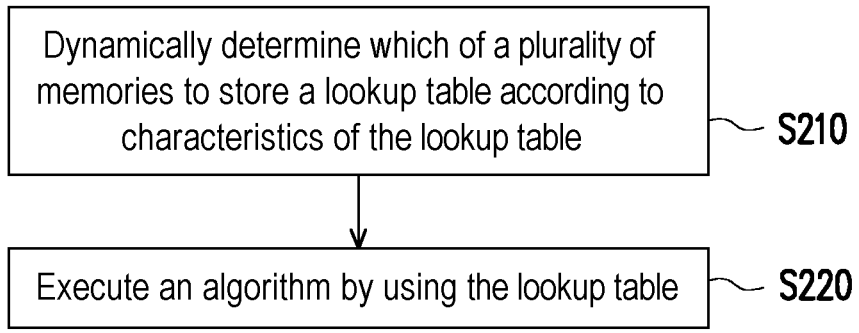
FIG. 2 is a schematic flowchart of an operation method of a computing device according to an embodiment of the invention.

FIG. 2 is a schematic flowchart of an operation method of a computing device 100 according to an embodiment of the invention. Referring to FIG. 1 and FIG. 2. In step S210, the processing circuit 110 may dynamically determine which of the memories 120_1 to 120_$n$ to store a lookup table according to characteristics of the lookup table. The processing circuit 110 may store a plurality of lookup tables by using different types of memories according to characteristics (a volume, a frequency of access, and the like) of each of the plurality of lookup tables, to obtain a most efficient configuration giving consideration to all of an access speed, access power consumption, and storage cost. In step S220, the processing circuit 110 may execute at least one algorithm by using the lookup table.

For example, a recommendation system may predict a "grade" or a "preference" of a user on an object or a service. A common recommendation system may execute word embedding table lookup, neural network computation, and/or other algorithms. Generally, a word embedding table includes a plurality of lookup tables of different volumes. The processing circuit 110 may execute various algorithms of the recommendation system, and the memories 120_1 to 120_$n$ may store a large quantity of lookup tables of the recommendation system. Before the computing device 100 is powered off, the processing circuit 110 may move the plurality of lookup tables from the memories 120_1 to 120_$n$ to the non-volatile storage device 130. After the computing device 100 is powered on, the processing circuit 110 may move the plurality of lookup tables from the non-volatile storage device 130 to the memories 120_1 to 120_$n$ to improve an access speed and system performance. Differences between the present embodiment and the prior art include: the processing circuit 110 in the present embodiment may dynamically determine positions in the memories 120_1 to 120_$n$ to store the plurality of lookup tables according to the characteristics of the plurality of lookup tables. Therefore, positions in the memories 120_1 to 120_$n$ to store the plurality of lookup tables of the recommendation system before the computing device 100 is powered off are different from positions in the memories 120_1 to 120_$n$ to store the plurality of lookup tables after the computing device 100 is powered on. The processing circuit 110 may perform table lookup on the memories 120_1 to 120_$n$ to obtain corresponding data (a table lookup result), and then execute, by using the corresponding data, the neural network computation and/or other algorithms to obtain a result of the recommendation system.

The processing circuit 110 may dynamically determine which of the memories 120_1 to 120_$n$ to store a lookup table according to characteristics of the lookup table. For example, "characteristics of the lookup table" include at least one of a data volume and a frequency of access of the lookup table.

In some embodiments, the processing circuit 110 may store the plurality of lookup tables in the memories 120_1 to 120_n according to a principle that "a lookup table with a larger frequency of access in the plurality of lookup tables is preferentially stored in a faster memory in the plurality of memories". For example, the processing circuit 110 may store, according to current frequencies of access of the plurality of lookup tables, a lookup table which is accessed frequently in a faster memory in the memories 120_1 to 120_n, and store a lookup table which is not accessed frequently in a slower memory in the memories 120_1 to 120_n.

In some other embodiments, the processing circuit 110 may store the plurality of lookup tables in the memories 120_1 to 120_n according to a principle that "a lookup table with a smaller data volume in the plurality of lookup tables is preferentially stored in a memory with a smaller space in the plurality of memories". For example, the processing circuit 110 may store, according to current data volumes of the plurality of lookup tables, a lookup table with a large data volume in a memory with a large storage space in the memories 120_1 to 120_n, and store a lookup table with a small data volume in a memory with a small storage space in the memories 120_1 to 120_n.

In still some other embodiments, the processing circuit 110 may store the plurality of lookup tables in the memories 120_1 to 120_n according to a principle that "a lookup table with a smaller data volume in the plurality of lookup tables is preferentially stored in a faster memory in the plurality of memories". For example, the processing circuit 110 may store, according to current data volumes of the plurality of lookup tables, a lookup table with a large data volume in a slower memory in the memories 120_1 to 120_n, and store a lookup table with a small data volume in a faster memory in the memories 120_1 to 120_n.

Based on the foregoing, the processing circuit 110 may dynamically determine which of the memories 120_1 to 120_n to store a lookup table according to characteristics of the lookup table. Therefore, the table lookup efficiency of the processing circuit 110 may be effectively improved.

Figure 3:
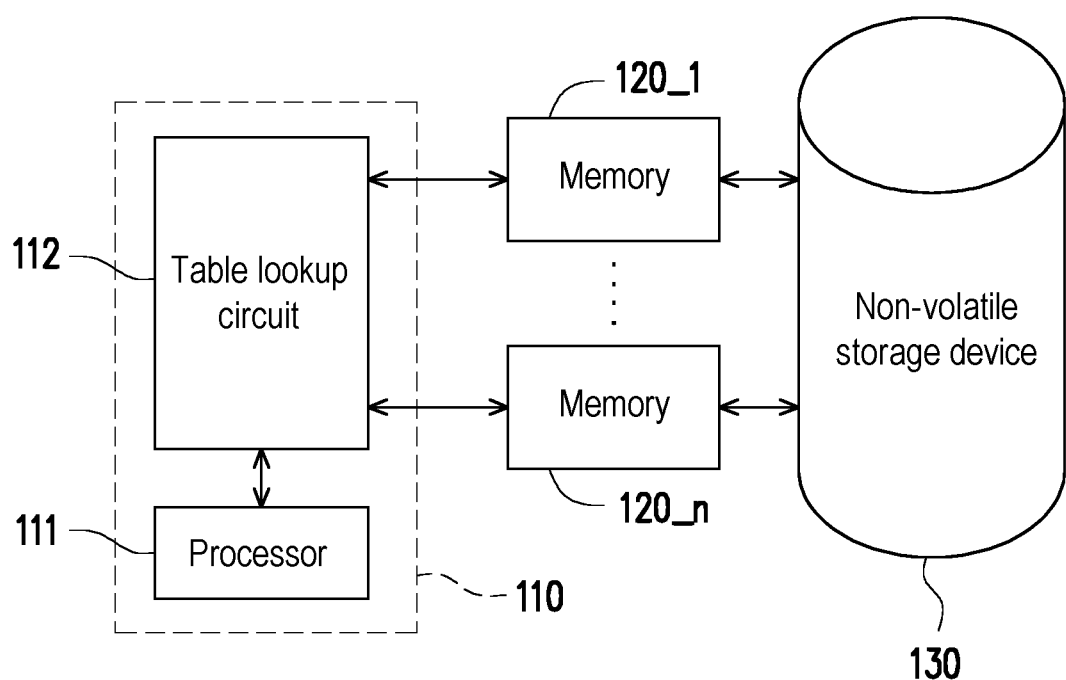
FIG. 3 is a schematic circuit block diagram of describing a processing circuit shown in FIG. 1 according to an embodiment of the invention.

FIG. 3 is a schematic circuit block diagram of describing a processing circuit 110 shown in FIG. 1 according to an embodiment of the invention. In the present embodiment shown in FIG. 3, the processing circuit 110 includes a processor 111 and a table lookup circuit 112. According to design requirements, the table lookup circuit 112 may be a field programmable gate array (FPGA), an application-specific integrated circuit (ASIC), or other elements/circuits. Compared with a general-purpose processor, the FPGA (or the ASIC) dedicated to table lookup has advantages such as lower cost, lower operation power consumption, a higher table lookup speed, and higher efficiency.

The processor 111 may execute at least one algorithm. Based on the running of the algorithm, the processor 111 may give a table lookup command to the table lookup circuit 112. The table lookup circuit 112 is coupled to the processor 111 to receive the table lookup command. The table lookup circuit 112 is further coupled to the memories 120_1 to 120_n to access one or more lookup tables. When the processor 111 gives the table lookup command to the table lookup circuit 112, the table lookup circuit 112 looks up, according to the table lookup command from the processor 111, lookup tables stored in the memories 120_1 to 120_n to obtain at least one piece of corresponding data (a table lookup result). The table lookup circuit 112 transfers the corresponding data back to the processor 111. The processor 111 may execute the algorithm by using the corresponding data (the table lookup result) provided by the table lookup circuit 112.

Based on the foregoing, the table lookup circuit 112 may look up, according to the table lookup command given by the processor 111, the lookup tables stored in the memories 120_1 to 120_n, and then transfer the table lookup result (the corresponding data) back to the processor. After the table lookup command is given, the processor 111 may be more concentrated on computation, and is not idle to wait for the corresponding data (the table lookup result). Therefore, the table lookup circuit 112 may share the workload, thereby effectively improving the efficiency of the processor 111.

Figure 4:
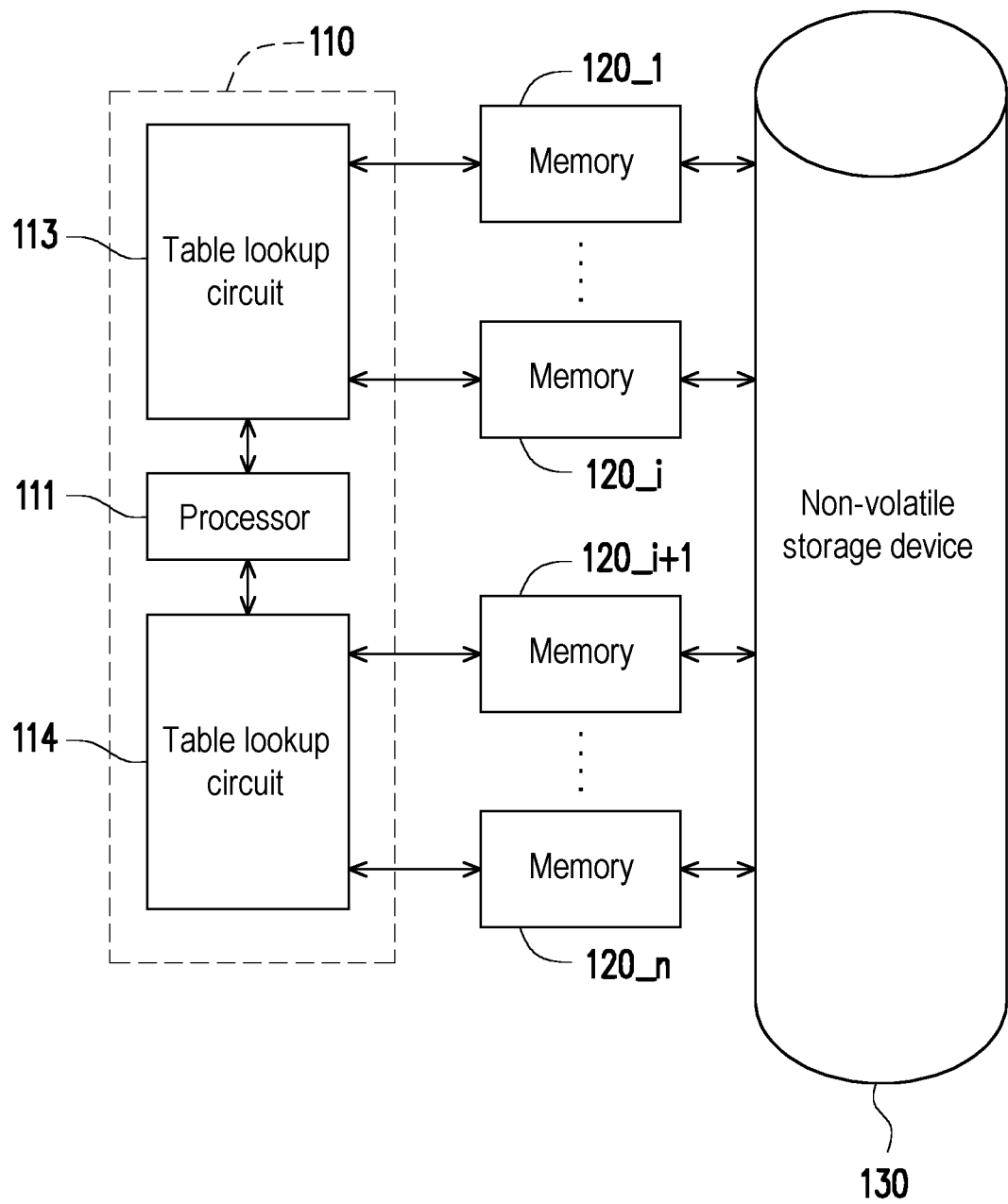
FIG. 4 is a schematic circuit block diagram of describing a processing circuit shown in FIG. 1 according to another embodiment of the invention.

FIG. 4 is a schematic circuit block diagram of describing a processing circuit 110 shown in FIG. 1 according to another embodiment of the invention. In the present embodiment shown in FIG. 4, the processing circuit 110 includes a processor 111, a table lookup circuit 113, and a table lookup circuit 114. Based on the running of an algorithm, the processor 111 may give a table lookup command to the table lookup circuit 113 and/or the table lookup circuit 114. The table lookup circuit 113 and the table lookup circuit 114 are coupled to the processor 111 to receive the table lookup command. The table lookup circuit 113 is further coupled to memories 120_1 to 120_i to access one or more lookup tables. The table lookup circuit 114 is further coupled to memories 120_i+1 to 120_n to access one or more lookup tables, where i and n are positive integers, and i is less than n. For the processor 111 shown in FIG. 4, reference may be made to related description of the processor 111 shown in FIG. 3, and for the table lookup circuit 113 and the table lookup circuit 114 shown in FIG. 4, reference may be made to related description of the table lookup circuit 112 shown in FIG. 3 for analogy. Therefore, the descriptions thereof are omitted.

Referring to FIG. 1, when the computing device 100 is running, the processing circuit 110 reads out, from the non-volatile storage device 130, a lookup table needing to be inquired. The processing circuit 110 may load, according to characteristics (a size of a required storage space, a frequency of access, and the like) of each of the plurality of lookup tables, the plurality of lookup tables in different types of memories, thereby optimizing total cost, power consumption, and computation performance of a system. For example, the memories 120_1 to 120_n include a first memory (for example, an SRAM) with a higher speed (but a smaller storage space), and a second memory (for example, a DRAM) with a lower speed (but a larger storage space). The processing circuit 110 may store a lookup table which needs a larger storage space or is not accessed frequently in the DRAM to reduce storage cost, and store a lookup table which needs a smaller storage space or is accessed frequently in the SRAM to reduce access time and required power consumption. In addition, if the lookup table with a large storage space requirement has an entry that needs to be accessed frequently, the entry may be stored in the SRAM to improve a reading speed.

For example, when the processing circuit 110 reads out one lookup table (a current lookup table) from the non-volatile storage device 130, the processing circuit 110 may calculate an evaluation for the current lookup table according to characteristics of the lookup table, and then the processing circuit 110 may store, according to a principle that "a lookup table with a larger evaluation is preferentially stored in a faster memory", the current lookup table in one of the first memory (the faster memory, for example, the SRAM) and the second memory (the slower memory, for example, the DRAM). For example, the processing circuit 110 may calculate the evaluation of the current lookup table by using an evaluation formula: $F=\alpha*v+\beta*f$, where F represents the evaluation of the current lookup table, v represents a data volume of the current lookup table, f represents a frequency of access of the current lookup table, and $\alpha$ and $\beta$ are two real numbers determined according to the design requirements. When the evaluation F of the current lookup table is greater than a threshold (the threshold is determined according to the design requirements), the processing circuit 110 may store the current lookup table in the first memory (the faster memory). When the evaluation F of the current lookup table is less than the threshold, the processing circuit 110 may store the current lookup table in the second memory (the slower memory).

Figure 5:
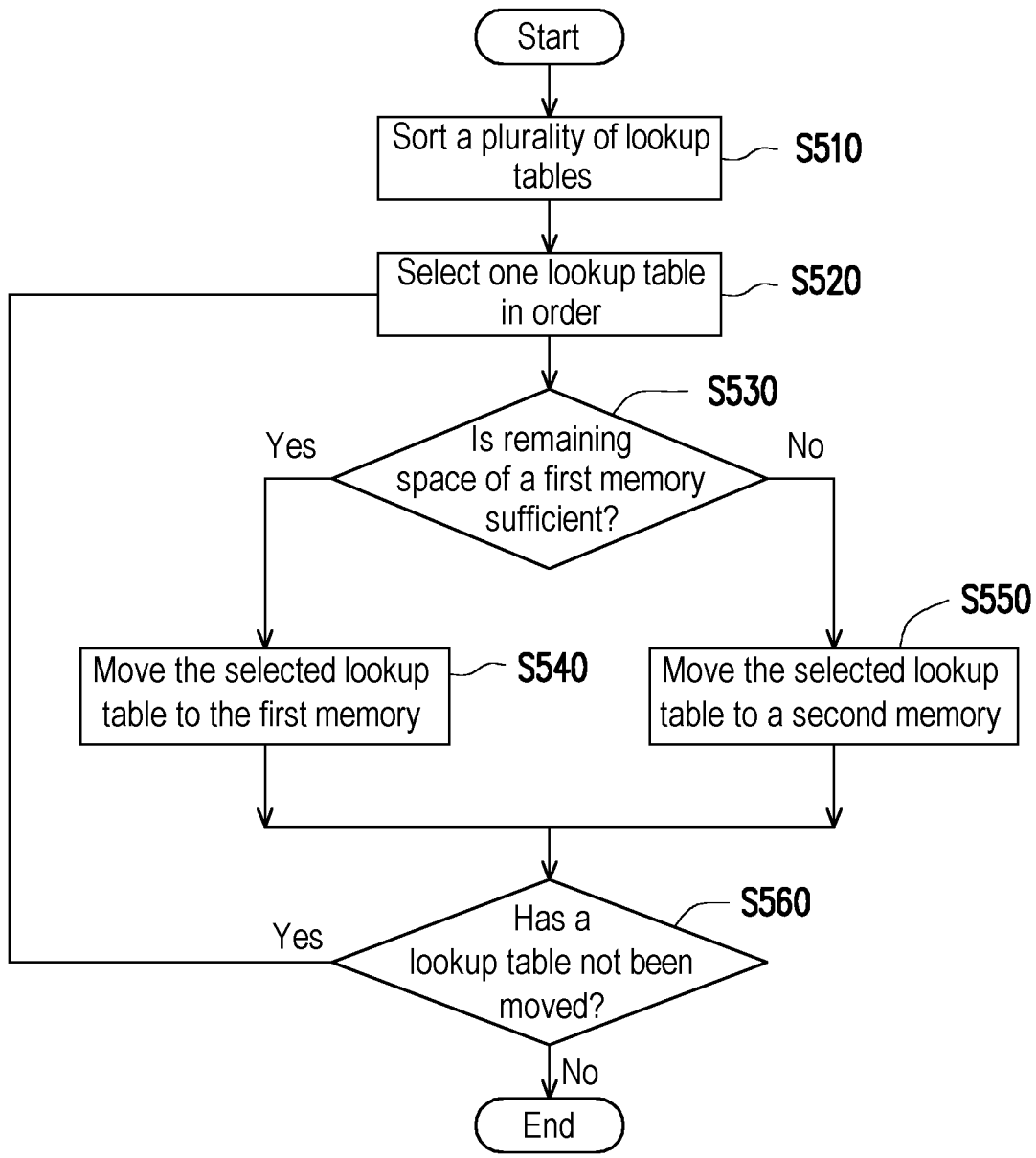
FIG. 5 is a schematic flowchart of an operation method of a computing device according to another embodiment of the invention.

FIG. 5 is a schematic flowchart of an operation method of the computing device 100 according to an embodiment of the invention. Referring to FIG. 1 and FIG. 5. The processing circuit 110 sorts lookup tables of the non-volatile storage device 130 (step S510), and then selects one lookup table from the plurality of lookup tables in order (step S520). The lookup tables may be sorted according to the design requirements. For example, in some embodiments, the processing circuit 110 may sort the plurality of lookup tables of the non-volatile storage device 130 according to data volumes of the lookup tables, and then select a lookup table with a smallest data volume from the plurality of lookup tables in order. In some other embodiments, the processing circuit 110 may sort the plurality of lookup tables of the non-volatile storage device 130 according to frequencies of access of the lookup tables, and then select a lookup table with a largest frequency of access from the plurality of lookup tables in order.

When remaining space of the first memory (the faster memory) is sufficient (a determining result is "Yes' in step S530), the processing circuit 110 may move the lookup table selected in step S520 from the non-volatile storage device 130 to the first memory (step S540). When the remaining space of the first memory (the faster memory) is insufficient (a determining result is "No" in step S530), the processing circuit 110 may move the lookup table selected in step S520 from the non-volatile storage device 130 to the second memory (the slower memory) (step S550).

When step S540 or step S550 is completed, the processing circuit 110 may perform step S560, to determine whether there is a lookup table in the non-volatile storage device 130 which has not been moved. When there is a lookup table in the non-volatile storage device 130 which has not been moved (a determining result is "Yes" in step S560), the processing circuit 110 may go back to step S520, to select a next lookup table in order.

Referring to FIG. 1, in some embodiments, the processing circuit 110 may divide each of the plurality of lookup tables of the non-volatile storage device 130 into a plurality of entries. The processing circuit 110 may store a lookup table dispersedly in a plurality of memories according to a principle that "an entry with a larger frequency of access in the plurality of entries is stored in a faster memory in the plurality of memories".

Figure 6:
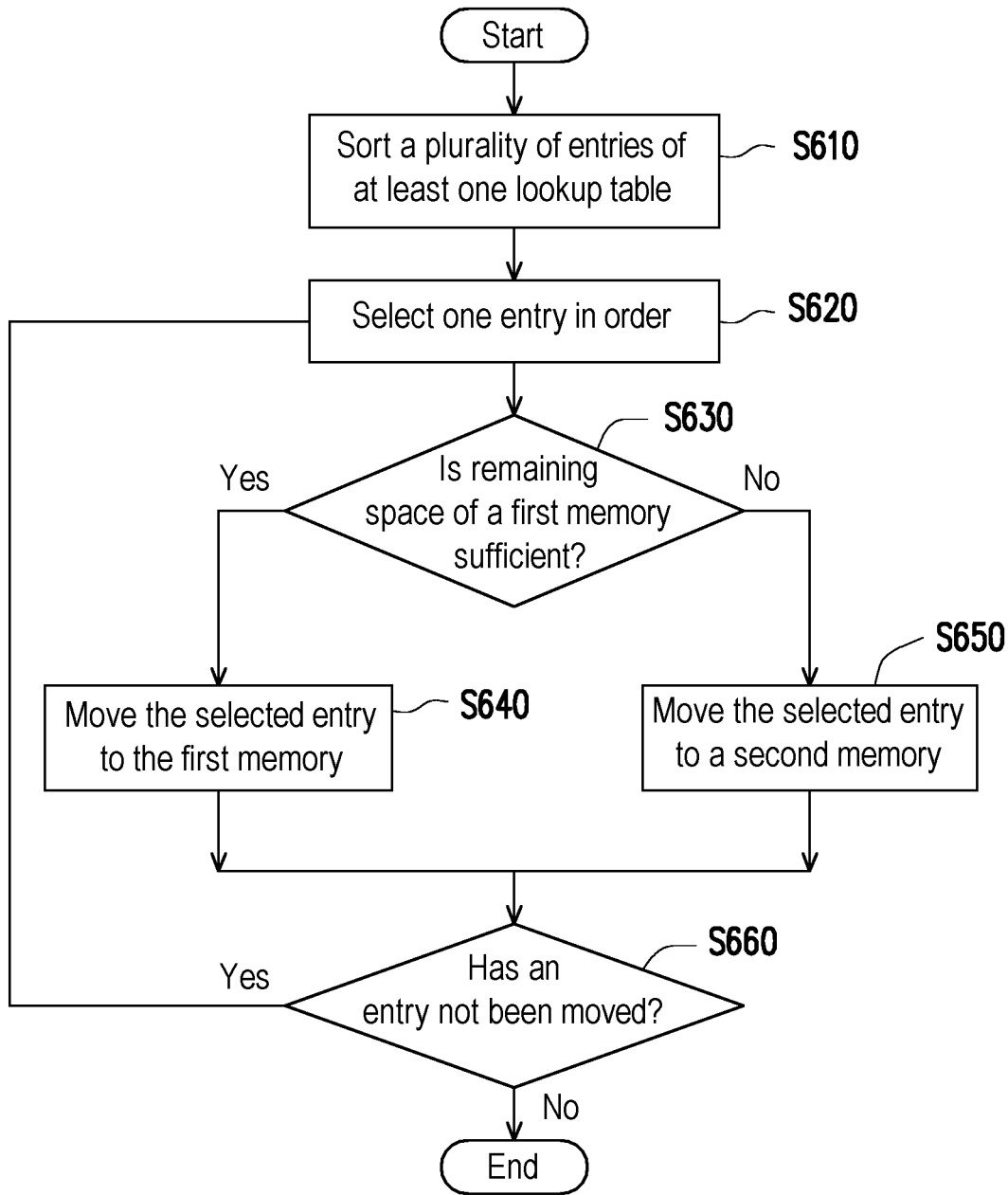
FIG. 6 is a schematic flowchart of an operation method of a computing device according to still another embodiment of the invention.

FIG. 6 is a schematic flowchart of an operation method of the computing device 100 according to still another embodiment of the invention. Referring to FIG. 1 and FIG. 6, the processing circuit 110 may divide each of the plurality of lookup tables in the non-volatile storage device 130 into a plurality of entries. The processing circuit 110 may sort the plurality of entries (step S610), and then select one entry from the plurality of entries in order (step S620). The entries may be sorted according to the design requirements. For example, in some embodiments, the processing circuit 110 may sort the plurality of entries in the non-volatile storage device 130 according to frequencies of access, and then select one entry with a largest frequency of access from the plurality of entries in order.

When remaining space of the first memory (the faster memory) is sufficient (a determining result is "Yes" in step S630), the processing circuit 110 may move the entry selected in step S620 from the non-volatile storage device 130 to the first memory (step S640). When the remaining space of the first memory (the faster memory) is insufficient (a determining result is "No" in step S630), the processing circuit 110 may move the entry selected in step S620 from the non-volatile storage device 130 to the second memory (the slower memory) (step S650).

When step S640 or step S650 is completed, the processing circuit 110 may perform step S660, to determine whether there is an entry in the non-volatile storage device 130 which has not been moved. When there is an entry in the non-volatile storage device 130 which has not been moved (a determining result is "Yes" in step S660), the processing circuit 110 may go back to step S620, to select a next entry in order. Therefore, a lookup table can be dispersedly stored in a plurality of memories of different types.

Figure 7:
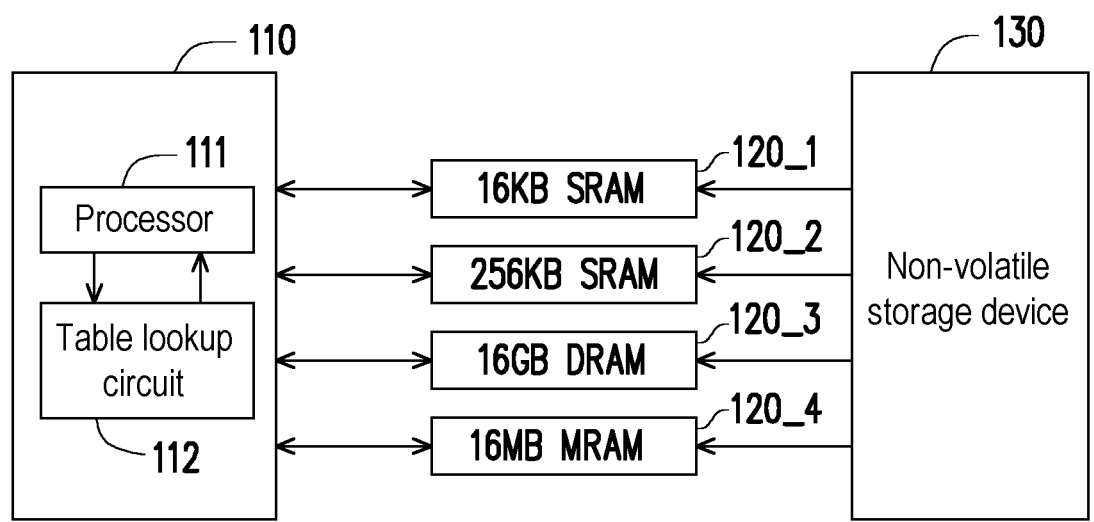
FIG. 7 is a schematic circuit block diagram of describing a computing device shown in FIG. 1 according to still another embodiment of the invention.

FIG. 7 is a schematic circuit block diagram of describing a computing device 100 shown in FIG. 1 according to still another embodiment of the invention. In the present embodiment shown in FIG. 7, the computing device 100 includes a processing circuit 110, a memory 120_1, a memory 120_2, a memory 120_3, a memory 120_4, and a non-volatile storage device 130. For the processing circuit 110, the memories 120_1 to 120_4, and the non-volatile storage device 130 shown in FIG. 7, reference may be made to related description of the processing circuit 110, the memories 120_1 to 120_n, and the non-volatile storage device 130 shown in FIG. 1 to FIG. 6. Therefore, the descriptions thereof are omitted.

It is to be noted that, FIG. 7 depicts a data flow between the non-volatile storage device 130 and the memories 120_1 to 120_4 and a data flow between the processing circuit 110 and the memory 120_1 to 120_4. However, these data flows do not represent an actual coupling relationship between the non-volatile storage device 130 and the memories 120_1 to 120_4 and an actual coupling relationship between the processing circuit 110 and the memories 120_1 to 120_4. For example, in some embodiments, the non-volatile storage device 130 may be coupled to the processing circuit 110, and the processing circuit 110 transfers data between the non-volatile storage device 130 and the memories 120_1 to 120_n. In some other embodiments, the non-volatile storage device 130 and the memories 120_1 to 120_4 may be coupled to the processing circuit 110 through a same bus (or different buses).

In the present embodiment shown in FIG. 7, the processing circuit 110 includes a processor 111 and a table lookup circuit 112. The table lookup circuit 112 is coupled to the memories 120_1 to 120_4 to access one or more lookup tables. Based on the running of the algorithm, the processor 111 may give a table lookup command to the table lookup circuit 112. The table lookup circuit 112 looks up, according to the table lookup command from the processor 111, lookup tables stored in the memories 120_1 to 120_4 to obtain at least one piece of corresponding data (a table lookup result). For the processor 111 and the table lookup circuit 112 shown in FIG. 7, reference may be made to related description of the processor 111 and the table lookup circuit 112 shown in FIG. 3. Therefore, the descriptions thereof are omitted.

In the present embodiment shown in FIG. 7, the memory 120_1 may include an SRAM with a capacity of 16 kilobytes (KB), the memory 120_2 may include an SRAM with a capacity of 256 KB, the memory 120_3 may include a DRAM with a capacity of 16 gigabytes (GB), and the memory 120_4 may include an MRAM with a capacity of 16 megabytes (MB). Generally, an access speed of an SRAM is higher than an access speed of a DRAM, and an access speed of an MRAM is between that of the SRAM and that of the DRAM.

The computing device 100 shown in FIG. 7 may be applied as a hardware computing platform of a recommendation system. After the computing device 100 is powered on, or when the processor 111 needs data of a word embedding lookup table, a plurality of lookup tables of the recommendation system are moved from the non-volatile storage device 130 to the memories 120_1 to 120_4. The processing circuit 110 may dynamically determine which of the memories 120_1 to 120_4 to store a lookup table according to characteristics of the lookup table. A table lookup operation of the recommendation system is performed by the table lookup circuit 112. The table lookup circuit 112 may transfer a table lookup result to the processor 111. The processor 111 may process neural network computation of the recommendation system.

Generally, in a process in which the table lookup circuit 112 duplicates (moves) a lookup table from the non-volatile storage device 130 to a memory (for example, the memory 120_1), if there is no sufficient space in the selected memory 120_1 to store the lookup table, old data of the memory 120_1 is written back to the non-volatile storage device 130, and then the table lookup circuit 112 duplicates (moves) the lookup table to the memory 120_1 to overwrite the old data. If the processor 111 needs the previously overwritten old data at a later time, the table lookup circuit 112 needs to duplicate (move) the old data from the non-volatile storage device 130 to the memory 120_1 again. Moving such data repetitively results in unnecessary power consumption of a system, and may result in a case in which the processor 111 cannot get the required data in time, thereby degrading system performance.

In order to prevent the foregoing situation from occurring frequently, the table lookup circuit 112 shown in FIG. 7 may store a lookup table with a data volume less than 2 KB and being most frequently looked up in the memory 120_1 (that is, the SRAM with 16 KB), and store a lookup table with a data volume less than 64 KB and being second most frequently looked up in the memory 120_2 (that is, the SRAM with 256 KB). In addition, if there is a lookup table with a capacity greater than 64 KB and there is a quite high probability that content of an entry of the lookup table is read, the entry is also stored in the memory 120_2 (other entries of the lookup table may be kept in the non-volatile storage device 130, or duplicated/moved to the memory 120_3). As for other lookup tables in the non-volatile storage device 130, the table lookup circuit 112 may store lookup tables with a data volume less than 1 MB in the memory 120_4 (that is, the MRAM with 16 MB), and store lookup tables with a data volume greater than 1 MB in the memory 120_3 (that is, the DRAM with 16 GB).

Based on the foregoing, the processing circuit 110 may store frequently looked-up lookup tables in the faster memory (for example, the SRAM) as much as possible, to improve a lookup speed. The independent memory 120_1 (the SRAM with 16 KB) is configured to store the most frequently looked-up lookup table, so that a probability that the lookup table in the memory 120_1 is overwritten by other data is reduced. The processing circuit 110 may store the lookup table with a data volume less than 1 MB in the memory 120_3 (that is, the DRAM with 16 GB), to reduce a probability that the lookup table with a data volume less than 1 MB is overwritten by another lookup tables with a large data volume. The lookup table with a large data volume is stored in the memory 120_3 (the DRAM with 16 GB), to reduce system memory cost.

According to different design requirements, blocks of the processing circuit 110, the processor 111, and (or) the table lookup circuit 112 may be implemented in a form of hardware, firmware, software (that is, a program), or a combination of more than one of the foregoing three.

For the hardware form, the blocks of the processing circuit 110, the processor 111, and (or) the table lookup circuit 112 may be implemented on a logic circuit on an integrated circuit. Related functions of the processing circuit 110, the processor 111, and (or) the table lookup circuit 112 may be implemented as hardware by using a hardware description language (for example, Verilog HDL or VHDL) or another suitable programming language. For example, the related functions of the processing circuit 110, the processor 111, and (or) the table lookup circuit 112 may be implemented as one or more controllers, microcontrollers, microprocessors, application-specific integrated circuits (ASIC), digital signal processors (DSP), field programmable gate arrays (FPGA), and/or various logic blocks, modules, and circuits of other processing units.

For the software form and/or the firmware form, the related functions of the processing circuit 110, the processor 111, and (or) the table lookup circuit 112 may be implemented as programming codes. For example, the processing circuit 110, the processor 111, and (or) the table lookup circuit 112 are implemented by using a general programming language (for example, C, C++, or assembly language) or another suitable programming language. The programming codes may be recorded/stored in a recording medium. For example, the recording medium includes a read only memory (ROM), a storage apparatus and/or a random access memory (RAM). A computer, a central processing unit (CPU), a controller, a microcontroller, or a microprocessor may read the programming codes from the recording medium and execute the programming codes, thereby achieving the related functions. A "non-transitory computer readable medium", for example, a tape, a disk, a card, a semiconductor memory, or a programmable logic circuit may be used as the recording medium. In addition, the program may be provided to the computer (or the CPU) through any transmission medium (a communication network, a radio wave, or the like). For example, the communication network is the Internet, a wired communication, a wireless communication, or another communication medium.

Based on the foregoing, in some embodiments, the processing circuit 110 may dynamically determine which of the memories 120_1 to 120_n to store a lookup table according to characteristics of the lookup table. Therefore, the table lookup efficiency may be effectively improved. In some embodiments, the table lookup circuit 112 may look up, according to the table lookup command given by the processor 111, the lookup tables stored in the memories 120_1 to 120_n, and then transfer the table lookup result (the corresponding data) back to the processor 111. Therefore, the table lookup circuit 112 may share the workload, thereby effectively improving the efficiency of the processor 111.

Although the invention has been described with reference to the above embodiments, the embodiments are not intended to limit the invention. A person of ordinary skill in the art may make variations and improvements without departing from the spirit and scope of the invention. Therefore, the protection scope of the invention should be subject to the appended claims.

What is claimed is:

1. A computing device, comprising:
a plurality of memories; and
a processing circuit, coupled to the plurality of memories, wherein the processing circuit dynamically determines which of the plurality of memories to store at least one lookup table according to characteristics of the at least one lookup table and the processing circuit executes at least one algorithm by using the at least one lookup table,
wherein a quantity of the at least one lookup table is plural, the processing circuit calculates an evaluation for each of the plurality of lookup tables according to the characteristics of the plurality of lookup tables, and the processing circuit stores the plurality of lookup tables in the plurality of memories according to a principle that "a lookup table with a larger evaluation in the plurality of lookup tables is preferentially stored in a faster memory in the plurality of memories",
wherein the plurality of memories comprise a faster memory and a slower memory, when the evaluation of a current lookup table of the plurality of lookup tables is greater than a threshold, the processing circuit preferentially stores the current lookup table in the faster memory, and when the evaluation of the current lookup table is less than the threshold, the processing circuit preferentially stores the current lookup table in the slower memory.

2. The computing device according to claim 1, wherein the characteristics of the at least one lookup table comprise at least one of a data volume and a frequency of access of the at least one lookup table.

3. The computing device according to claim 1, wherein the processing circuit stores the plurality of lookup tables in the plurality of memories according to a principle that "a lookup table with a smaller data volume in the plurality of lookup tables is preferentially stored in a memory with a smaller space in the plurality of memories".

4. The computing device according to claim 1, wherein the processing circuit stores the plurality of lookup tables in the plurality of memories according to a principle that "a lookup table with a smaller data volume in the plurality of lookup tables is preferentially stored in a faster memory in the plurality of memories".

5. The computing device according to claim 1, wherein the processing circuit stores the plurality of lookup tables in the plurality of memories according to a principle that "a lookup table with a larger frequency of access in the plurality of lookup tables is preferentially stored in a faster memory in the plurality of memories".

6. The computing device according to claim 1, wherein each of the at least one lookup table is divided into a plurality of entries and the processing circuit dispersedly stores the at least one lookup table in the plurality of memories according to a principle that "an entry with a larger frequency of access in the plurality of entries is stored in a faster memory in the plurality of memories".

7. The computing device according to claim 1, wherein the processing circuit calculates the evaluation of the lookup table by using an evaluation formula, $F=\alpha*v+\beta*f$, where F represents the evaluation of the lookup table, v represents a data volume of the lookup table, f represents a frequency of access of the lookup table, and $\alpha$ and $\beta$ are two real numbers.

8. The computing device according to claim 1, wherein the processing circuit comprises:
a processor, configured to give a table lookup command and execute the at least one algorithm; and
at least one table lookup circuit, coupled to the processor and the plurality of memories, wherein
when the processor gives the table lookup command to the at least one table lookup circuit, the at least one table lookup circuit looks up, according to the table lookup command from the processor, the at least one lookup table stored in the plurality of memories to obtain at least one piece of corresponding data, and
the processor executes the at least one algorithm by using the at least one piece of corresponding data provided by the at least one table lookup circuit.

9. The computing device according to claim 1, wherein the plurality of memories comprises at least two of a static random access memory, a dynamic random access memory, a magnetic random-access memory, a magnetoresistive random-access memory, and a flash memory.

10. An operation method of a computing device, comprising:
dynamically determining, by a processing circuit, which of a plurality of memories to store at least one lookup table according to characteristics of the at least one lookup table; and
executing, by the processing circuit, at least one algorithm by using the at least one lookup table,
wherein a quantity of the at least one lookup table is plural, the operation method comprising:
calculating, according to the characteristics of the plurality of lookup tables, an evaluation for each of the plurality of lookup tables; and
storing the plurality of lookup tables in the plurality of memories according to a principle that "a lookup table with a larger evaluation in the plurality of lookup tables is preferentially stored in a faster memory in the plurality of memories",
wherein the plurality of memories comprise a faster memory and a slower memory, the operation method comprising:
preferentially storing a current lookup table in the faster memory when the evaluation of the current lookup table of the plurality of lookup tables is greater than a threshold; and
preferentially storing, by the processing circuit, the current lookup table in the slower memory when the evaluation of the current lookup table is less than the threshold.

11. The operation method according to claim 10, further comprising:
storing the plurality of lookup tables in the plurality of memories according to a principle that "a lookup table with a smaller data volume in the plurality of lookup tables is preferentially stored in a memory with a smaller space in the plurality of memories".

12. The operation method according to claim 10, further comprising:
storing the plurality of lookup tables in the plurality of memories according to a principle that "a lookup table with a smaller data volume in the plurality of lookup tables is preferentially stored in a faster memory in the plurality of memories".

13. The operation method according to claim 10, further comprising:
storing the plurality of lookup tables in the plurality of memories according to a principle that "a lookup table with a larger frequency of access in the plurality of lookup tables is preferentially stored in a faster memory in the plurality of memories".

14. The operation method according to claim 10, further comprising:
dividing each of the at least one lookup table into a plurality of entries; and
storing the at least one lookup table dispersedly in the plurality of memories according to a principle that "an entry with a larger frequency of access in the plurality of entries is stored in a faster memory in the plurality of memories".

15. The operation method according to claim 10, further comprising:
calculating the evaluation of the lookup table by using an evaluation formula, $F=\alpha*v+\beta*f$, where F represents the evaluation of the lookup table, v represents a data volume of the lookup table, f represents a frequency of access of the lookup table, and $\alpha$ and $\beta$ are two real numbers.

16. The operation method according to claim 10, further comprising:
looking up, by at least one table lookup circuit, according to a table lookup command from a processor of the processing circuit the at least one lookup table stored in the plurality of memories when the processor gives the table lookup command to the at least one table lookup circuit of the processing circuit, to obtain at least one piece of corresponding data; and
executing, by the processor, the at least one algorithm by using the at least one piece of corresponding data provided by the at least one table lookup circuit.

17. A computing device, comprising:
at least one memory, configured to store at least one lookup table;
a processor, configured to give a table lookup command and execute at least one algorithm; and
at least one table lookup circuit, coupled to the processor and the at least one memory, wherein
when the processor gives the table lookup command to the at least one table lookup circuit, the at least one table lookup circuit looks up, according to the table lookup command from the processor, the at least one lookup table stored in the at least one memory to obtain at least one piece of corresponding data, and
the processor executes the at least one algorithm by using the at least one piece of corresponding data provided by the at least one table lookup circuit,
wherein a quantity of the at least one lookup table is plural, the processor calculates an evaluation for each of the plurality of lookup tables according to characteristics of the plurality of lookup tables, and the processor stores the plurality of lookup tables in the at least one memory according to a principle that "a lookup table with a larger evaluation in the plurality of lookup tables is preferentially stored in a faster memory in the at least one memory",
wherein the at least one memory comprises a faster memory and a slower memory, when the evaluation of a current lookup table of the plurality of lookup tables is greater than a threshold, the processor preferentially stores the current lookup table in the faster memory, and when the evaluation of the current lookup table is less than the threshold, the processor preferentially stores the current lookup table in the slower memory.

* * * * *